United States Patent

[11] 3,592,073

[72] Inventors Stuart D. Pool
Naperville;
Edward Svereika, Chicago, Ill.; Jack B.
Findlay, Minneapolis, Minn.
[21] Appl. No. 13,223
[22] Filed Feb. 5, 1970
Division of Ser. No. 753,378, Aug. 19, 1968,
Patent No. 3,537,246
[45] Patented July 13, 1971
[73] Assignee International Harvester Company
Chicago, Ill.

[54] CONTROL SYSTEM FOR TREE SHAKER
APPARATUS
5 Claims, 6 Drawing Figs.
[52] U.S. Cl. .................................................. 74/471 R,
137/636
[51] Int. Cl. ...................................................... G05g 9/04
[50] Field of Search ........................................... 74/471, 471
XY; 137/636

[56] References Cited
UNITED STATES PATENTS
3,088,328 5/1963 Peterson ..................... 74/471
3,338,269 8/1967 Carbert et al ................ 74/471 X Primary Examiner—Milton Kaufman
Attorney—Noel G. Artman ABSTRACT: A tree shaker apparatus including a frame pivotally mounted on a tractor for swinging movement about a vertical axis and a horizontal axis. A boom and clamp assembly is mounted on the frame for movement longitudinally thereof. Movement of the frame and the boom and clamp assembly is provided by hydraulic cylinders controlled through respective valves. The valves are actuated by selective operation of a control lever which is mounted for swinging movement in three modes which are manifested in similar movements of the frame and the boom and clamp assembly to position the clamp in gripping relation on a tree limb to be shaken by the apparatus.

PATENTED JUL 13 1971
3,592,073
SHEET 1 OF 3
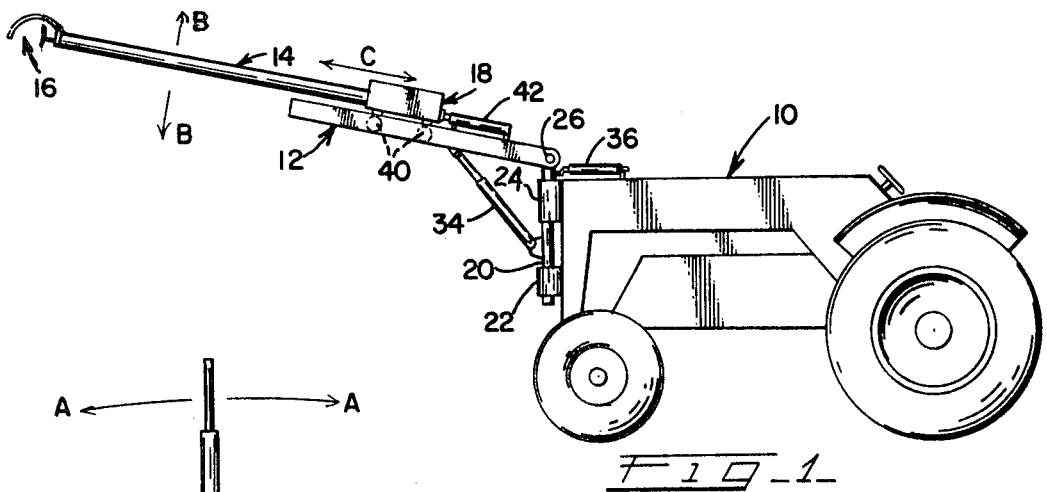
Fig-1-
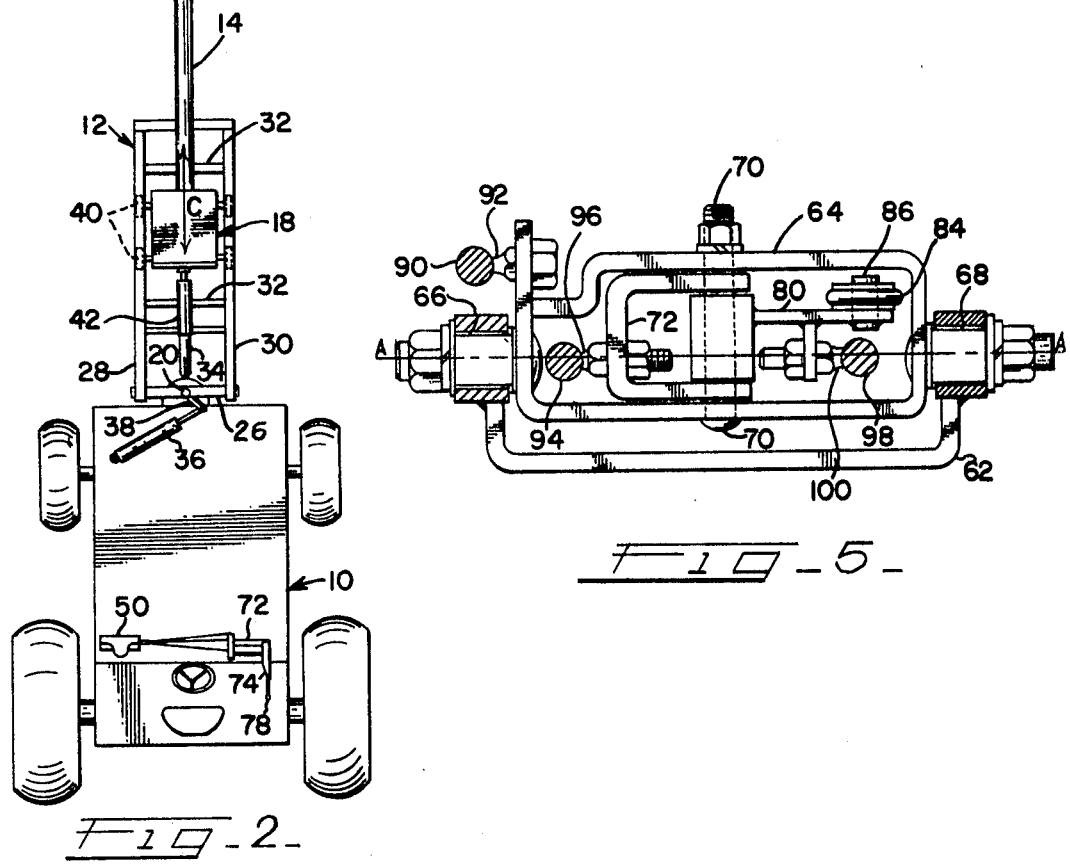
Fig-2-
Fig-5-
INVENTORS
STUART D. POOL
EDWARD SVEREIKA
JACK B. FINDLAY
Neal C. Johnson ATT'Y.

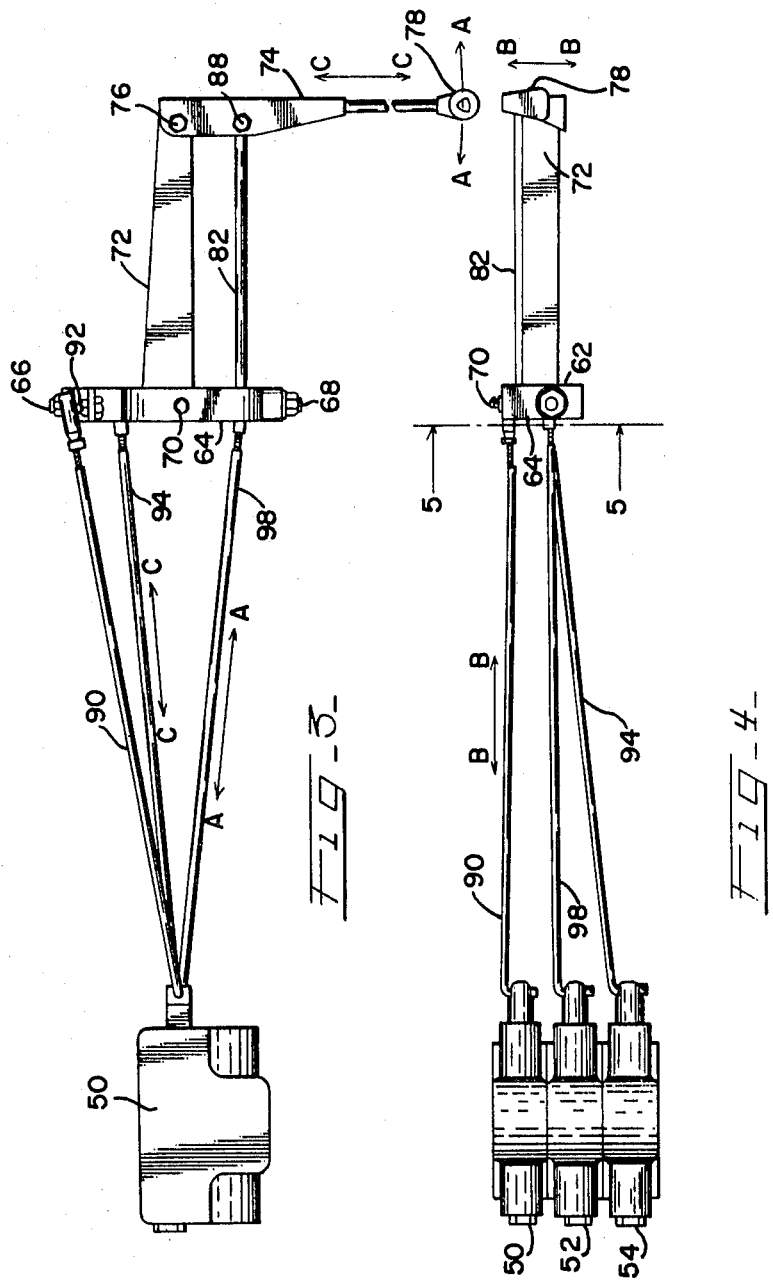

3,592,073

CONTROL SYSTEM FOR TREE SHAKER APPARATUS

This application is a division of applicants' copending application Ser. No. 753,378 filed Aug. 19, 1968, now U.S. Pat. No. 3,537,246.

BACKGROUND OF THE INVENTION

1. Field of the Invention

The invention relates generally to a control mechanism for a tree shaker apparatus and more particularly to a control mechanism for the flow control valves of a hydraulic power system.

2. Description of the Prior Art

Fruit harvesting equipment includes machines which mount a clamp assembly and a shaker mechanism on a boom which is swingably mounted on a mobile support such as a tractor. The clamp assembly is designated to grip a limb of a fruit-bearing tree, whereupon the shaker mechanism is actuated to shake the fruit from the limb. Hydraulic power systems have been deviced which move the boom and the clamp so that selected tree branches may be gripped for shaking. These systems conventionally utilize a plurality of control levers to provide the desired movements of the boom. In addition the remaining operating modes, such as clamping, unclamping, shaking, etc., each require a separate control lever. The result is that a fully hydraulically controlled tree shaker apparatus may require a very large number of control levers.

The disadvantage of a control system requiring a large number of levers includes extensive periods of operator training; complexity of design; high costs of manufacture; and a limited capability of the operator to sense or "feel" the response of the machine to the operation of the control levers. The latter disadvantage may be accentuated when modern high-pressure hydraulic systems are used.

SUMMARY

With the foregoing in mind it is accordingly a primary object of the invention to provide an improved control for a fruit harvesting machine of the tree shaker type wherein movements of the control imparted by the operator will result in similar movements of the clamp-supporting boom of the machine.

Another object is to provide a control for a tree shaker apparatus wherein three modes of movement of the clamp-supporting boom are controlled by a single control lever.

Another object in accordance with the preceding object is to provide a control wherein the three modes of movement of the boom are provided in response to similar movements of the control lever.

Yet another object is to provide a control system for a tree shaker apparatus wherein a plurality of valves are selectively operable individually, concurrently, or in any desired sequence by means of a single control lever with the result that smoothly coordinated movements of the boom of the apparatus are provided.

Briefly, these and other objects and advantages of the invention are attained by providing a tree shaker apparatus having a mobile carrier to which a frame is pivotally connected about a first vertical axis and a first horizontal axis. A boom and clamp assembly is mounted on the frame for movement along the longitudinal axis thereof. Respective power means are provided for moving the frame about the vertical and horizontal axes and for moving the boom and clamp assembly along the frame longitudinal axis.

Control means are provided for selectively actuating the respective power means and includes a lever mounted for movement about a second vertical axis, a second horizontal axis, and along its longitudinal axis. Movement of the lever about the second vertical axis, the second horizontal axis, and the lever longitudinal axis, is reflected in similar movement of the frame about the first vertical axis and the first horizontal axis and movement of the boom and clamp assembly along the frame longitudinal axis, respectively.

BRIEF DESCRIPTION OF THE DRAWINGS

FIG. 1 is a side elevation view of a tree shaker apparatus mounted on a tractor of the agricultural type;

FIG. 2 is a top plan view of the apparatus of FIG. 1 and further illustrating generally a control lever system of the invention;

FIG. 3 is an enlarged plan view of the control lever system shown generally in FIG. 2;

FIG. 4 is a side elevation view of the control lever system of FIG. 3;

FIG. 5 is a sectional view of the control lever system taken in the direction of arrows 5-5 of FIG. 4; and, FIG. 6 is a schematic view of the hydraulic control system of the tree shake apparatus of the invention.

DESCRIPTION OF THE PREFERRED EMBODIMENT

Figure 6:
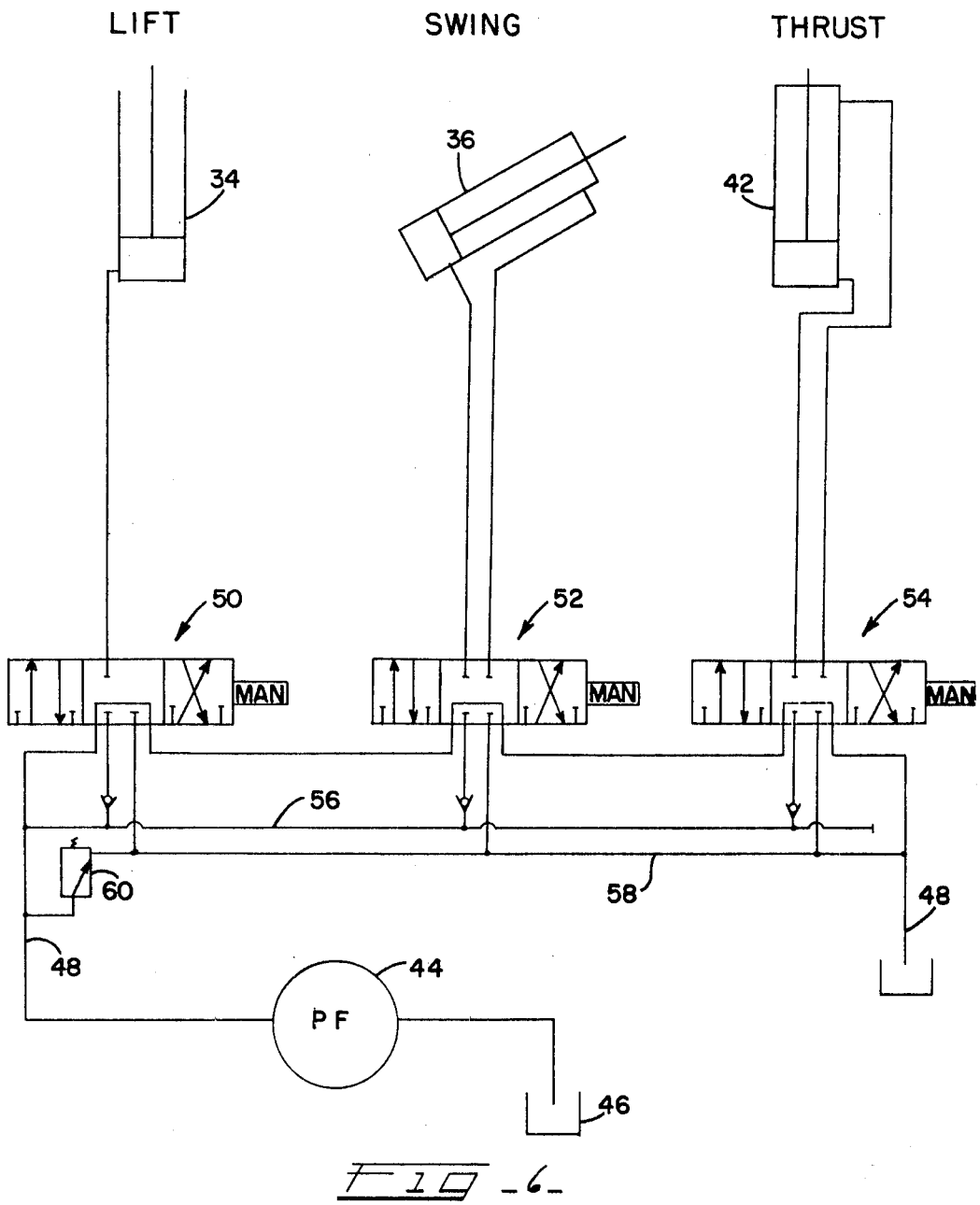

Referring first to FIG. 1, there is shown a tractor 10 of the agricultural type which is adapted to carry the tree shaker apparatus embodying the invention. A frame shown generally at 12 is pivotally mounted on the tractor 10 for supporting an elongated boom 14 thereon. A clamp assembly 16 is mounted on the outer end of the boom while a shaker mechanism 18 is mounted on the inner supported end of the boom. The shaker mechanism 18 may be of any suitable type known in the art and adapted to rapidly move the boom back and forth on the frame 12 so as to shake a tree limb gripped by the conventional clamp assembly 16.

A vertical standard 20 is journaled and supported in a pair of vertically spaced brackets 22 and 24 mounted on the forward end of the tractor 10. As best shown in FIG. 2 a transversely extending horizontal rod 26 is secured to the top portion of the vertical standard 20.

The frame 12 includes a pair of longitudinally extending U-channel members 28 and 30 disposed in spaced parallel facing relation. A plurality of cross braces 32 extend between the channel members 28 and 30 to provide a rigid structure for the frame. The rearward ends of the channel members 28 and 30 are journaled on the extremities of the horizontal rod 26. A hydraulic cylinder 34 is pivotally coupled between the vertical standard 20 and the underside of the frame 12 for pivoting the frame about the horizontal rod 26. As best shown in FIG. 2, a hydraulic cylinder 36 is pivotally connected between the tractor 10 and a lever arm 38 which is rigidly secured to the standard 20. Accordingly, the frame 12 is adapted to be swung about the vertical standard 20 in response to actuation of the hydraulic cylinder 36.

The boom 14 and shaker mechanism 18 are supported on the frame 12 for movement to selected positions longitudinally on the frame. Toward that result, the boom and shaker mechanism include rollers 40 which are received in the U-channel members 28 and 30. A hydraulic cylinder piston unit 42 is mounted on the frame 12 with the piston rod thereof being in engagement with the rearward portion of the shaker mechanism 18. It will thus be seen that the boom and shaker mechanism are movable longitudinally on the frame in response to actuation of the piston-cylinder unit 42.

The hydraulic system for actuating the cylinders 34, 36, and 42 is shown schematically in FIG. 6. Hydraulic power is provided by a pump 44 which draws hydraulic fluid from a sump 46, the pump and sump being a part of the hydraulic system of the tractor 10. The pump 44 supplies fluid pressure to a pressure line 48. A plurality of valves 50, 52, and 54 are connected in series with the pressure line 48 which leads back to the sump. In the embodiment of the invention shown, each of the valves 50, 52 and 54 comprises a three-position, six-way, spring-centered, manually operated, open-center type valve of known construction. The valves 50, 52 and 54 are arranged to selectively direct pressure fluid to the cylinders 36, 34 and 42 respectively, through the interconnecting pressure lines shown. A pressure line 56 branches from the pressure line 48 and connects the valves 50, 52 and 54 in series as shown. A line 58 connects each of the valves to the line 48 and thus back to the sump. It will be understood that the connections of the valves 50, 52 and 54 with the pressure lines 48 and 56 and the return line 58, enables the valves to be actuated individually, concurrently, or in any desired sequence. A pressure relief valve 60 is connected between the pressure line 48 and the return line 58 for relieving excess pressures back to the sump.

It will be apparent from the foregoing that the cylinders 34, 36, and 42 will be operated in response to selective actuation o the flow control valves 50, 52, and 54, respectively. In a practical embodiment of the invention, the valves 50, 52 and 54 are arranged in a vertical stack as shown in FIG. 4 and may be mounted on the tractor 10 in the general area indicated in plan view in FIG. 2.

A control system for actuating the valves will now be described in detail with reference to FIGS. 3, 4 and 5. A support bracket 62 of generally U-shape is mounted on the tractor proximate to the stack of valves and the operator's station. A trunnion member 64 in the form of a generally rectangular hoop includes a pair of end pins 66 and 68 which are journaled in the support bracket 62. As shown in FIG. 5, the trunnion member 64 is mounted for pivoting movement about a horizontal axis A defined by the coaxial centerlines of the pins 66 and 68. A pivot pin 70 is mounted on the trunnion member 64 so as to extend vertically as shown. A control arm 72 which is preferably U-shaped in cross section, is journaled on the pivot pin 70 and extends laterally from the trunnion member 64 as shown in FIGS. 3 and 4. A control lever 74 is pivotally connected to an end of the arm 72 by a vertical pivot pin 76. The lever 74 is generally horizontally disposed and extends from the arm 72 at substantially a right angle thereto. The lever 74 terminates at an end in knob 78 disposed for gripping by the operator.

As shown in FIG. 5, a link 80 is journaled on the vertical pivot pin 70 between the spaced flanges of the control arm 72. A control rod 82 terminates at one end in an eye portion 84 received on a stud 86 mounted on the link 80. The other end of the control rod 82 is pivotally connected to the lever 74 by a vertical pin 88.

An elongated rod 90 is coupled at one end to the actuating spool of the valve 50. The other end of the rod 90 is pivotally connected to a stud 92 mounted on the trunnion member 64 as shown in FIGS. 3 and 5. A second rod 94 is coupled between the actuating spool of the valve 54 and a stud 96 mounted on the control arm 72. A third rod 98 is coupled between the actuating spool of the valve 52 and a stud 100 mounted on the link 80.

As best seen in FIG. 5, the stud 92 is disposed in spaced relation above the horizontal pivot axis A of the trunnion member 64. The studs 96 and 100 are disposed to connect with the rods 94 and 98, respectively, on the pivot axis A.

In operation, assume that the operator wishes to swing the frame and boom about the vertical standard 20 in the direction of arrows A in FIG. 2. Referring to FIG. 3, the lever 74 is pivoted about the vertical pivot pin 76 to the left or right in the direction of arrows A. The resulting movement of the control rod 82 causes the link 80 (FIG. 5) to pivot about the pivot pin 70 and thus move the rod 98 to actuate the valve 52. The effect of actuating the valve 52 into either of its operative positions is readily apparent with reference to FIG. 6. Accordingly, the cylinder 36 is actuated to swing the frame and boom to the extent desired.

To raise or lower the frame and boom in the direction of arrows B in FIG. 1, the lever 74 is raised or lowered in the direction of arrows B in FIG. 4. This causes the trunnion member 64 to pivot about the horizontal pivot axis A in FIG. 5 and thus moves the rod 90 to actuate the valve 50. Actuation of the valve 50 into one of its operative positions directs pressure fluid into the lift cylinder 34 to raise the frame and boom about the rod 26. The other operative position of the valve 50 permits the pressure fluid to drain to the sump as the frame and boom lower under the force of gravity.

The boom 14 and shaker mechanism 18 are movable as a unit to selected positions longitudinally on the frame 12 in the direction of arrows C in FIGS. 1 and 2. To achieve this result, the lever 74 is moved either forwardly or rearwardly along its longitudinal axis in the direction of arrows C in FIG. 3. This causes the control arm 72 to pivot about the vertical pivot pin 70. The rod 94 is thus moved to actuate the valve 54 into either of its operative positions. The thrust cylinder 42 is accordingly actuated to move the shaker mechanism and boom in the desired forward or rearward direction on the frame.

It will be seen that the control mechanism is constructed to permit movement of the boom in three distinct modes, that is lift, swing, and longitudinal thrust, in response to similar movements of the single control lever 74. Moreover, the modes of movement may be conducted individually, concurrently, or in any desired sequence to provide a smoothly coordinated operation requiring a minimum of operator training.

Various changes falling within the scope and spirit of the invention may occur to those skilled in the art. The invention is therefore not to be thought of as limited to the specific embodiment set forth.

What we claim is:

1. A control system for selectively actuating a plurality of valves, comprising:

a support bracket, a trunnion member pivotally journaled on said bracket about a horizontal axis, a control arm journaled on said trunnion member about a vertical pivot pin, a lever pivotally coupled to said control arm about a vertical axis, a first rod coupled between a first one of said valves and said trunnion member whereby movement of said lever to pivot said trunnion member about said horizontal axis results in movement of said first rod to actuate said first valve, a second rod coupled between a second one of said valves and said control arm whereby movement of said lever to pivot said control arm about said pivot pin results in movement of said second rod to actuate said second valve, a link journaled on said vertical pivot pin, a control rod coupled between said link and said lever for swinging said link about said pivot pin in response to moving said lever about said vertical axis, a third rod coupled between said link and a third one of said valves whereby movement of said lever to pivot said link about said pivot pin results in movement of said third rod to actuate said third valve.

2. The subject matter of claim 1, wherein said second rod is pivotally coupled to said control arm at said horizontal axis whereby movement of said lever to move said first rod imparts no movements to said second rod.

3. The subject matter of claim 1, wherein said third rod is pivotally coupled to said link at said horizontal axis whereby movement of said lever to move said first rod imparts no movement to said third rod.

4. The subject matter of claim 1, wherein said control arm and said link are each independently journaled on said vertical pivot pin whereby movement of said second rod imparts no movement to said third rod and movement of said third rod imparts no movement to said second rod so that the respective valves are selectively operable.

5. The subject matter of claim 1, wherein said second and third rods are pivotally connected to said control arm and said link respectively at said horizontal axis, whereby movement of said lever to move said first rod imparts no movement to said second and third rods.